A. F. BATCHELDER.
ELECTRIC LOCOMOTIVE TRUCK.
APPLICATION FILED NOV. 13, 1909.
1,008,581.
Patented Nov. 14, 1911.
2 SHEETS—SHEET 1.
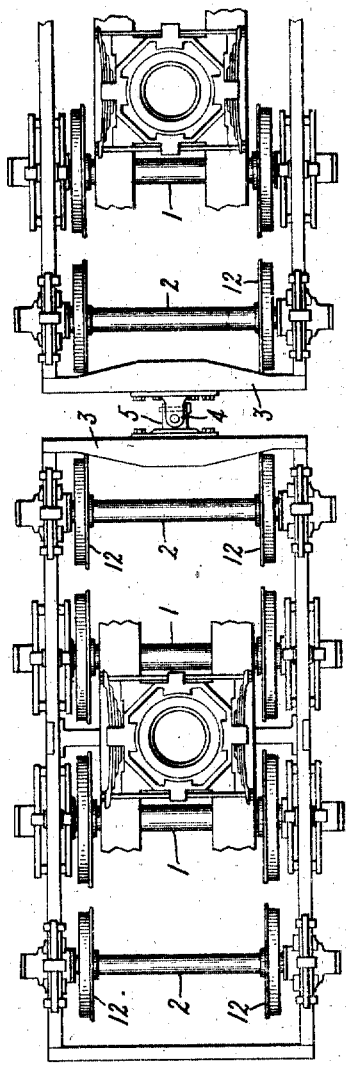
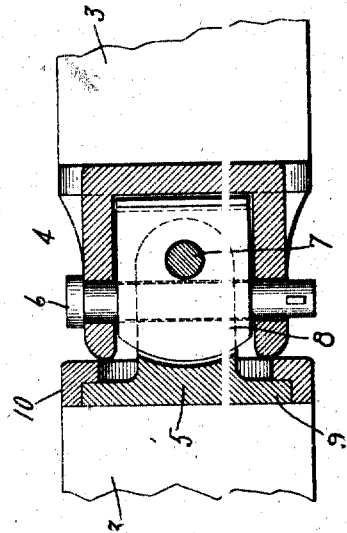
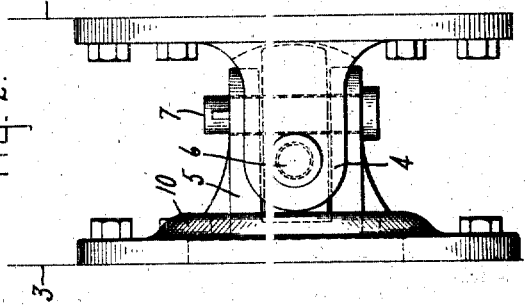
WITNESSES:
J. Ellis Glen
J. Earl Ryan
INVENTOR:
ASA F. BATCHELDER
BY Albert G. Davis
ATTY.

A. F. BATCHELDER.
ELECTRIC LOCOMOTIVE TRUCK.
APPLICATION FILED NOV. 13, 1909.
1,008,581.
Patented Nov. 14, 1911.
2 SHEETS—SHEET 2.
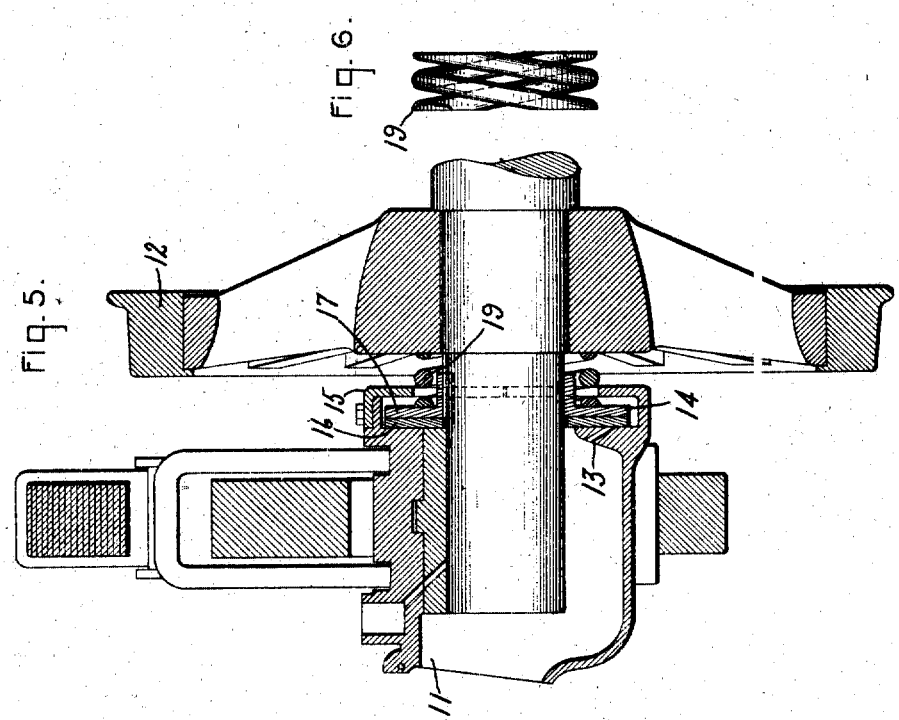
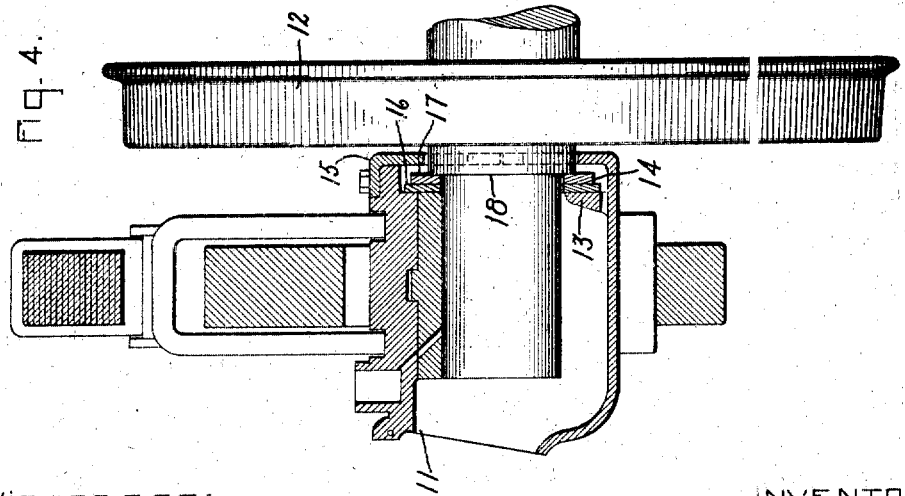
WITNESSES:
J. Ellis Glen.
J. Earl Ryan
INVENTOR:
ASA F. BATCHELDER
By Allen G. Davis
ATTY.

UNITED STATES PATENT OFFICE.

ASA F. BATCHELDER, OF SCHENECTADY, NEW YORK, ASSIGNOR TO GENERAL ELECTRIC COMPANY, A CORPORATION OF NEW YORK.

ELECTRIC-LOCOMOTIVE TRUCK.

1,008,581.  Specification of Letters Patent.  Patented Nov. 14, 1911.

Application filed November 13, 1909. Serial No. 527,757.

*To all whom it may concern:*

Be it known that I, ASA F. BATCHELDER, a citizen of the United States, residing at Schenectady, county of Schenectady, State of New York, have invented certain new and useful Improvements in Electric-Locomotive-Trucks, of which the following is a specification.

This invention relates to electric railway vehicles and especially to certain details of construction of an electric locomotive provided with two trucks. In order to prevent excessive "nosing" of the trucks in such a locomotive, it has been found desirable to connect the trucks by a joint which prevents any relative lateral or vertical movement of their adjacent ends as shown for example in my pending application, Serial Number 492,743, filed April 28, 1909.

One part of the present invention relates to a new and improved connection between trucks whereby entire freedom of articulation is secured. Moreover, it is found that when two trucks thus hinged together run from a tangent upon a curve the side thrust of the leading wheels against the outer rail is increased by the fact that the center of the movement of the leading truck is the point of connection between the two trucks. The same cause produces a thrust of the rear wheels of the leading truck against the inner rail. In order to reduce the injurious effects of these side thrusts upon the rails and the locomotive, I interpose a wear ring between the wheel hub and a shoulder in the journal box, and I also contemplate inserting a yielding cushion at this point, such as a helical spring. Wear rings have been used heretofore, but they have been outside of the journal box, so that the lubricant supplied thereto tends to work off onto the tread of the wheel, or upon the trucks, where it decreases the coefficient of friction between the wheel and the rail. Moreover, such a ring soon collects dirt and grit and wears rapidly. By placing this ring inside the journal box, I avoid these troubles and also insure the proper lubrication of the ring.

In the accompanying drawings, Figure 1 is a plan view of two trucks connected by my improved universal joint and equipped with my end thrust devices, one truck being partly broken away; Fig. 2 is a plan view of the joint, on a large scale; Fig. 3 is a vertical section of said joint; Fig. 4 is a sectional elevation of one of the truck wheels, showing the thrust ring; Fig. 5 is a similar view showing the spring cushions; and Fig. 6 is an elevation of the spring.

The trucks are of swivel type and in the form shown have four axles each: the two middle ones, 1 being equipped with electric motors (not shown), and the end axles, 2 having smaller wheels. The trucks are each adapted to be pivotally connected to the body of the locomotive in any suitable manner. The adjacent end members 3 of the frames of these two trucks are made heavy and stiff to carry the parts of the universal joint which connect the trucks. This joint is made as follows: Secured to each end member is a bifurcated head 4, 5, each having alined holes in its jaws to receive their respective pins 6 and 7. The jaws of one head are arranged in a plane at right angles to those of the other, so that the axes of one pin, as 6, is vertical and that of the other pin is horizontal. A block 8 fits loosely between the two pairs of jaws, and both pins pass through said block, preferably close together and each being near the outer end of its own jaws and adjacent to the inner end of the fork in the other head, so that said pins interlock. One of said heads, as 4, is rigidly secured to its respective end member 3, but the other head 5, has a circular footflange 9 which can rotate freely under a flanged and overlapping coupling ring 10, the axis of rotation being the longitudinal and normally horizontal axis of the two heads. This joint thus provides for relative angular movement of the two heads on three axes all at right angles, to wit: that of the vertical pin 6, that of the horizontal pin 7 and that of the circular foot 9. The joint is thus a universal hinge, and provides for every possible relative angular movement of the two trucks without allowing any relative transverse or vertical displacement of the trucks. To render the hinge as compact as possible consistent with strength the surfaces of the block 8 and the adjacent surfaces of the heads may be curved to correspond with their arcs of movement. It will be seen that the hinge is simple in construction and is strong enough to transmit tractive effort from one truck to the other, while permitting said trucks to assume all possible angles with each other without separating.

In the journal boxes 11 of the wheels 12 on each truck is formed a seat 13 in a plane perpendicular to the axle. The lower half of this seat forms one wall of a pocket 14 for oil. An overhanging guard 15 is secured to the upper part of the journal box to form a protecting housing for the ring 16 which rests against said seat concentric with the axle. Abutting against this ring is a washer 17, which is shown in Fig. 4 as a plain flat ring and in Fig. 5 as a flanged ring. In Fig. 4 a shoulder 18 on the axle bears against said washer; while in Fig. 5 there is no shoulder on the axle, but a helical spring 19 abuts between the washer and the hub of the wheel 12, the washer being keyed to the axle to rotate with it and the spring. The latter gives a cushioning effect when the truck is subjected to the side thrusts set up on entering a curve. In both cases, the washer and the ring afford good bearing surfaces to take the thrust and consequent rubbing and wear, their meeting faces being shielded from dirt and well lubricated. The universal hinge between the trucks assists in reducing the end thrusts on the axles by giving the utmost freedom of angular movement to the two trucks.

What I claim as new and desire to secure by Letters Patent of the United States, is,—
1. In a locomotive, the combination with two trucks adapted to be pivoted to the body, of a forked head on each truck, one of said heads being rotatable, and a transverse pin in each fork, said pins interlocking.
2. In a locomotive, the combination with two trucks adapted to be pivoted to the body, of a forked head on each truck, one of said heads having a circular foot rotatable on a horizontal axis, and vertical and horizontal pins, respectively, arranged transverse to said forks, and interlocking with each other.

3. In a locomotive, the combination with two trucks adapted to be pivoted to the body, of a forked head on each truck, one of said heads having a circular foot rotatable on a horizontal axis, vertical and horizontal pins, respectively, arranged transverse to said forks and interlocking with each other, and a loose block through which both pins pass.

4. In a locomotive, the combination with two trucks each provided with two or more axles, and adapted to be pivoted to the body of the locomotive, of intersecting forked heads on the adjacent ends of said trucks, one disposed in a vertical plane and the other in a horizontal plane, a loose block filling the space between said forks, a transverse pin near the outer end of each fork passing through said block and interlocking with the other pin, a circular foot for one of the said heads, and an overlapping coupling flange permitting said foot and head to rotate on a horizontal axis.

5. In a locomotive, the combination with two trucks adapted to be pivoted to the body and provided with two or more axles, of a universal hinge connecting the adjacent ends of said trucks, and a thrust ring surrounding each axle and located inside of the journal box.

In witness whereof, I have hereunto set my hand this 12th day of November, 1909.

ASA F. BATCHELDER.

Witnesses:
BENJAMIN B. HULL,
HELEN ORFORD.